United States Patent
Ramsden et al.

(10) Patent No.: US 8,125,918 B2
(45) Date of Patent: Feb. 28, 2012

(54) METHOD AND APPARATUS FOR EVALUATING ADAPTIVE JITTER BUFFER PERFORMANCE

(75) Inventors: David Ramsden, Wall, NJ (US); Bing Chen, RedBank, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 576 days.

(21) Appl. No.: 12/332,067

(22) Filed: Dec. 10, 2008

(65) Prior Publication Data

US 2010/0142388 A1 Jun. 10, 2010

(51) Int. Cl.
H04L 12/26 (2006.01)

(52) U.S. Cl. .......... 370/252; 370/248; 370/465

(58) Field of Classification Search ........... 370/352, 370/252, 248, 250, 251
See application file for complete search history.

(56) References Cited

U.S. PATENT DOCUMENTS

| | | | |
|---|---|---|---|
| 6,370,120 B1 * | 4/2002 | Hardy | 370/252 |
| 6,775,240 B1 * | 8/2004 | Zhang et al. | 370/251 |
| 6,996,068 B1 * | 2/2006 | Sherlock | 370/248 |
| 7,050,400 B1 * | 5/2006 | Chen et al. | 370/250 |
| 7,450,601 B2 * | 11/2008 | Sundqvist et al. | 370/412 |
| 7,746,797 B2 * | 6/2010 | El-Hennawey et al. | 370/250 |
| 7,869,377 B2 * | 1/2011 | Clark | 370/252 |
| 7,881,284 B2 * | 2/2011 | Lin et al. | 370/352 |

* cited by examiner

*Primary Examiner* — Hassan Kizou
*Assistant Examiner* — Emmanuel Maglo

(57) ABSTRACT

A method and system for providing a test signal to evaluate the performance of an adaptive jitter buffer are disclosed. For example, the method transmits a test signal into a communication network, and applies a jitter impairment along a path traversed by the test signal in the network preceding a device supporting a Voice over Internet Protocol (VoIP) service, wherein the device having an adaptive jitter buffer. The method then analyzes the test signal that is received from the device to determine a performance of the adaptive jitter buffer.

20 Claims, 4 Drawing Sheets

METHOD AND APPARATUS FOR EVALUATING ADAPTIVE JITTER BUFFER PERFORMANCE

The present invention relates generally to communication network and, more particularly, to a method and apparatus for evaluating adaptive jitter buffer performance in communication networks, e.g., packet networks such as Voice over Internet Protocol (VoIP) networks.

BACKGROUND OF THE INVENTION

Voice over Internet Protocol (VoIP) network equipment, such as SIP phones, Terminal Adapters, and Media Gateways, converts voice signals into Internet Protocol (IP) packets for transport over the VoIP networks. These devices all use jitter buffers to store voice packets for some period of time before they are played back to the users, to avoid packet loss problems due to jitter, i.e., variations in packet delay, in the VoIP networks. Many of these devices use adaptive jitter buffers which vary the size of their jitter buffer in response to variations of the jitter in the network. There are many specialized algorithms that are used by adaptive jitter buffers which attempt to vary the buffer size to simultaneously minimize packet loss and delay on VoIP calls. Thus, adaptive jitter buffers increase or decrease the number of VoIP packets being stored in response to the amount of jitter in the VoIP network. However, each time the jitter buffer changes its size, a discontinuity, which causes voice quality impairments, is introduced in the voice signal. Thus, impairments caused by changes in the size of the jitter buffer include adding gaps of silence when a jitter buffer expands and deleting portions of voice signals when the jitter buffer shrinks. As such, network equipment having inferior algorithms for varying the size of their jitter buffer will cause noticeable impairments that will impact the quality of the voice signal.

SUMMARY OF THE INVENTION

In one embodiment, the present invention discloses a method and system for providing a test signal to evaluate the performance of an adaptive jitter buffer. For example, the method transmits a test signal into a communication network, and applies a jitter impairment along a path traversed by the test signal in the network preceding a device supporting a Voice over Internet Protocol (VoIP) service, wherein the device having an adaptive jitter buffer. The method then analyzes the test signal that is received from the device to determine a performance of the adaptive jitter buffer.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
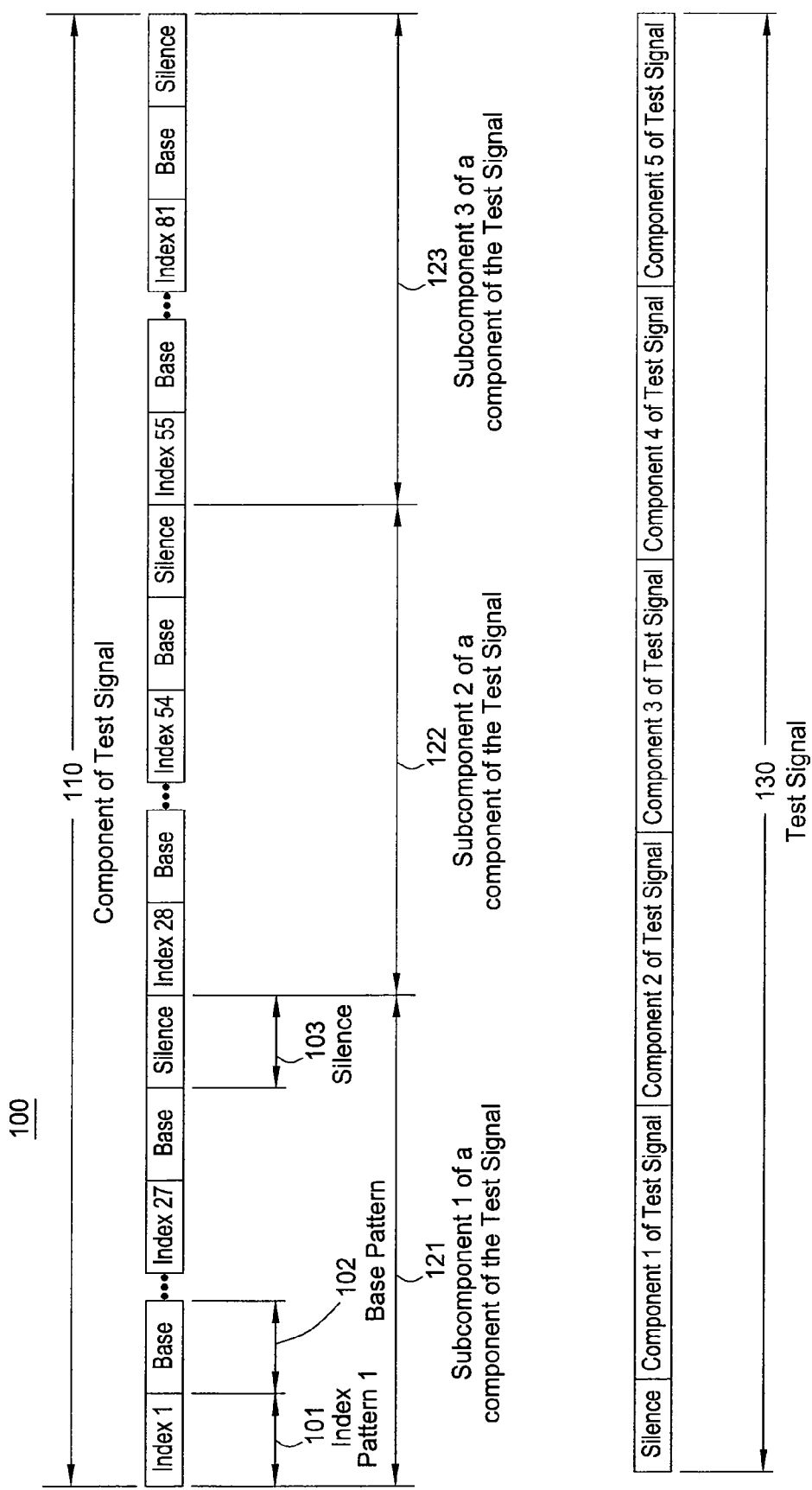
FIG. 1 illustrates an illustrative structure of the test signal related to the present invention.

As discussed above, Voice over Internet Protocol (VoIP) network equipment, such as SIP phones, Terminal Adapters, and Media Gateways, converts voice signals into Internet Protocol (IP) packets for transport over VoIP networks. These devices all use jitter buffers to store voice packets for some period of time before they are played back to users, to avoid packet loss problems due to jitter, i.e. variations in packet delay, in VoIP networks. Adaptive jitter buffers may increase or decrease the number of VoIP packets being stored in response to the amount of jitter in the VoIP network. Unfortunately, each time the jitter buffer changes size, a discontinuity, which causes voice quality impairments, is introduced in the voice signal.

Currently, there is no automated test which can systematically evaluate adaptive jitter buffer performance. To address this need, the present invention enables the evaluation of adaptive jitter buffer performance in communication networks, e.g., packet networks such as Voice over Internet Protocol (VoIP) networks.

In one embodiment, the present invention provides a unique test signal and procedure to evaluate the performance of adaptive jitter buffer algorithms used in VoIP network devices and services. For example, the present invention transmits a test signal over a VoIP call connection where the jitter is being controlled and, through an analysis of the received signal, the present invention is able to determine how often the adaptive jitter buffer has changed and how large the changes have been. Namely, the test signal allows changes in the size of the adaptive jitter buffer to be identified. In one embodiment, the test signal sends various tones in predefined time intervals, e.g., 10 ms intervals, through a VoIP connection and records the received signal at the output of the connection.

When the received signal is analyzed, any changes from the original signal will indicate packet loss or a jitter buffer change. The present invention allows a user to identify how often the buffer size is changed, how large the changes are, and whether the adaptive buffer algorithm uses any concealment techniques to mask the impairments. This information is very useful for determining the impact of the adaptive jitter buffer algorithm's changes on voice quality. For example, the test signal and method of the present invention can be used to evaluate the performance of network equipment that employs an adaptive buffer algorithm.

In one embodiment, the test signal has three (3) components. The first component is an index pattern which is a sequence of four (4) tones which is used in the analysis to synchronize the received (impaired) signal and the original (transmitted) signal. The second component is a base pattern which is a repeating sequence of 10 different tones which is played after each index sequence. The third component comprises silence periods which are used to determine if the adaptive jitter buffer makes modifications to its size during silence to avoid adding discernible impairments. For example, the test signal uses 12 distinct frequencies in the voiceband (between 300 and 3400 Hz). Note that, the 12 distinct frequencies within the voiceband are selected to be sufficiently far apart to allow adequate separation between these frequencies for easy identification and analysis purposes. In one embodiment, the distinct frequencies selected are at least 250 Hz apart. It should be noted that the present invention is not limited to these specific frequencies. In other words, other frequencies can also be adapted into a test signal to produce similar results without departing from the scope of the present invention.

In one embodiment, the index pattern uses four groups of three distinct frequencies, i.e., a total of 12 distinct frequencies. One frequency from each of these groups is used in the index, creating a total of 81 different indexes. In one embodiment of the present invention, the four frequency groups are:

1254, 1504, 1754 Hz
504, 754, 1004 Hz
2754, 3004, 3254 Hz
2004, 2254, 2504 Hz

In one embodiment of the present invention, the base pattern uses the following sequence of 10 distinct frequencies:

504, 1004, 1504, 2004, 2504, 3004, 2254, 1754, 1254, 754 Hz

In general, the 10 frequencies can be selected from any 10 of 12 distinct frequencies used by the index pattern arranged in any order.

Each of the individual frequencies in the index and base patterns are played for a predefined period of time, e.g., 10 milliseconds (ms). This length is a configurable parameter which is chosen because many jitter buffers make changes to their size in 10 ms or larger increments.

The use of the 81 different index patterns can be varied in a known way for each repetition. In one embodiment, the first three index patterns can use the same frequencies of the first tone from each of the first three groups of index frequencies (e.g., 1254, 504, 2754 Hz) and vary the fourth tone by using the three different frequencies from the fourth group of index frequencies to make the following three different index patterns:

1254, 504, 2754, 2004 Hz (e.g. index pattern 101 as shown in FIG. 1)
1254, 504, 2754, 2254 Hz
1254, 504, 2754, 2504 Hz A similar variation in the index pattern is continued until all 81 index patterns have been exhausted, at which point the signal starts with the initial index pattern again.

FIG. 1 illustrates an exemplary structure 100 of the test signal related to the present invention. For example, a set of 27 different index patterns followed by base patterns (e.g., base pattern 102 shown in FIG. 1) is played before a 1 second period of silence (e.g., silence pattern 103 shown in FIG. 1) is played (shown as subcomponent 1 of a component of the test signal 121 in FIG. 1). This is followed by a second sequence of 27 different index patterns followed by base patterns and another 1 second of silence (shown as subcomponent 2 of a component of the test signal 122 in FIG. 1). The component of the test signal is completed by playing the final sequence of 27 remaining index patterns followed by base patterns and another 1 second of silence (shown as subcomponent 3 of a component of the test signal 123 in FIG. 1). The entire component of the test signal is shown as 110 in FIG. 1.

In one embodiment, one component of the test signal lasts 14.34 seconds (shown as component of the test signal 110 in FIG. 1). It can be repeated multiple times to create a test signal which can identify slower changes in jitter buffers. For example, the test signal starts with a 1 second of silence followed by repetitions of the components of the test signal. For example, 5 repetitions of the component of the test signal with a preceding 1 second of silence can be constructed to provide a 72.7 second long test signal (e.g., test signal 130 shown in FIG. 1). It should be noted that the number of components and the number of subcomponents that are employed in a test signal is not limited to the illustrative implementation as shown in FIG. 1. In other words, any number of components and subcomponents can be employed in a test signal to satisfy the requirements of a particular implementation without deviating from the scope of the present invention.

Figure 2:
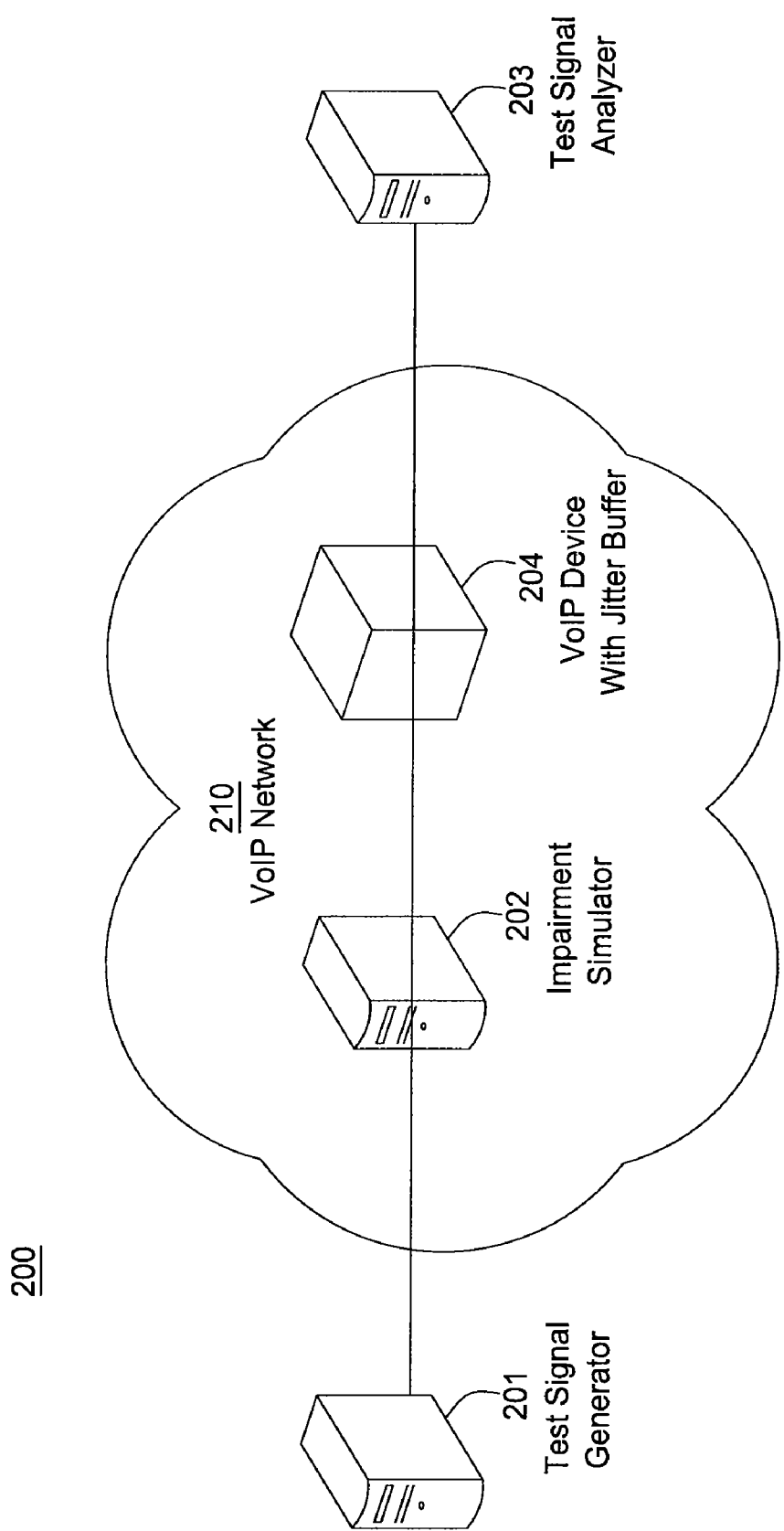
FIG. 2 illustrates an illustrative test configuration using the test signal related to the present invention.

FIG. 2 illustrates an exemplary test configuration 200 using the test signal related to the present invention. In FIG. 2, the test signal generator 201 creates or retrieves from a storage device the test signal, which is then transmitted through the VoIP network 210 which has an impairment simulator 202 to modify the jitter experienced by VoIP calls. The test configuration also uses a test signal analyzer 203 to record the received test signal after it has gone through the jitter buffer in a VoIP device 204 (e.g., a unit under test). It should be noted that device 204 can be perceived broadly as a device supporting a Voice over Internet Protocol (VoIP) service. Furthermore, it should be noted that the unit under test can be tested in a controlled lab environment, or it can be tested under real conditions, e.g., where the unit under test has already been deployed in an operating network.

After the received signal has been recorded, test signal analyzer 203 uses analysis software to determine how the jitter buffer reacted to the jitter introduced by the impairment simulator 202. Impairment simulator 202 can be used in two ways to evaluate the jitter buffer's performance. One way adds a fixed delay to the transmission path for a set period of time and then removes the fixed delay. This evaluates how the jitter buffer responds to changes in fixed delay with different length of time intervals. The second way adds a randomly varying level of jitter to evaluate the jitter buffer's response.

It should be noted that a VoIP device can respond to changes in jitter of a VoIP call in various ways. For moderate increases in the delay, VoIP devices with an adaptive jitter buffer can increase the buffer size to avoid losing packets because they arrive too late. Increasing the size of the jitter buffer effectively increases how long the VoIP device waits before transmitting the received voice packets. When an adaptive jitter buffer increases its size by an amount, it creates a gap in the transmitted signal equal to that amount. With the test signal given above, that gap will show up at the test signal analyzer 203 as either:

- a silent gap added within an index pattern or a base pattern in the received test signal;
- a period where the VoIP device uses a packet loss concealment algorithm to mask the missing signal by repeating one or more previous frequencies from an index pattern or a base pattern in the test signal; or
- an increase in length in one of the one second silent periods within the received test signal.

Repeated frequencies can be easily distinguished from packet loss because the frequencies following the gap are the correct one and no frequencies in the original test signal are lost. When packet loss occurs, some of the test signal is lost and can be replaced by previous frequencies or silence.

In cases where the jitter buffer decreases its size, this change can be identified by two changes:

- One or more frequencies in the received test signal are missing and are not replaced by any other signal;
- A silent period is less than 1 second in length.

By using the test signal to identify when and how much the jitter buffer shrinks, it can determine how severely the adaptive jitter buffer will impact performance.

One feature of the test signal is the use of the index pattern to resynchronize the original and impaired signals when large gaps have been inserted in the signal or a large portion of the signal has been deleted. The test signal repeats after 14.34 seconds which is much longer than any delay change that can occur in any VoIP networks and can be used to reliably determine when a change in the received test signal indicates part of the signal has been lost or a gap has been introduced.

Figure 3:
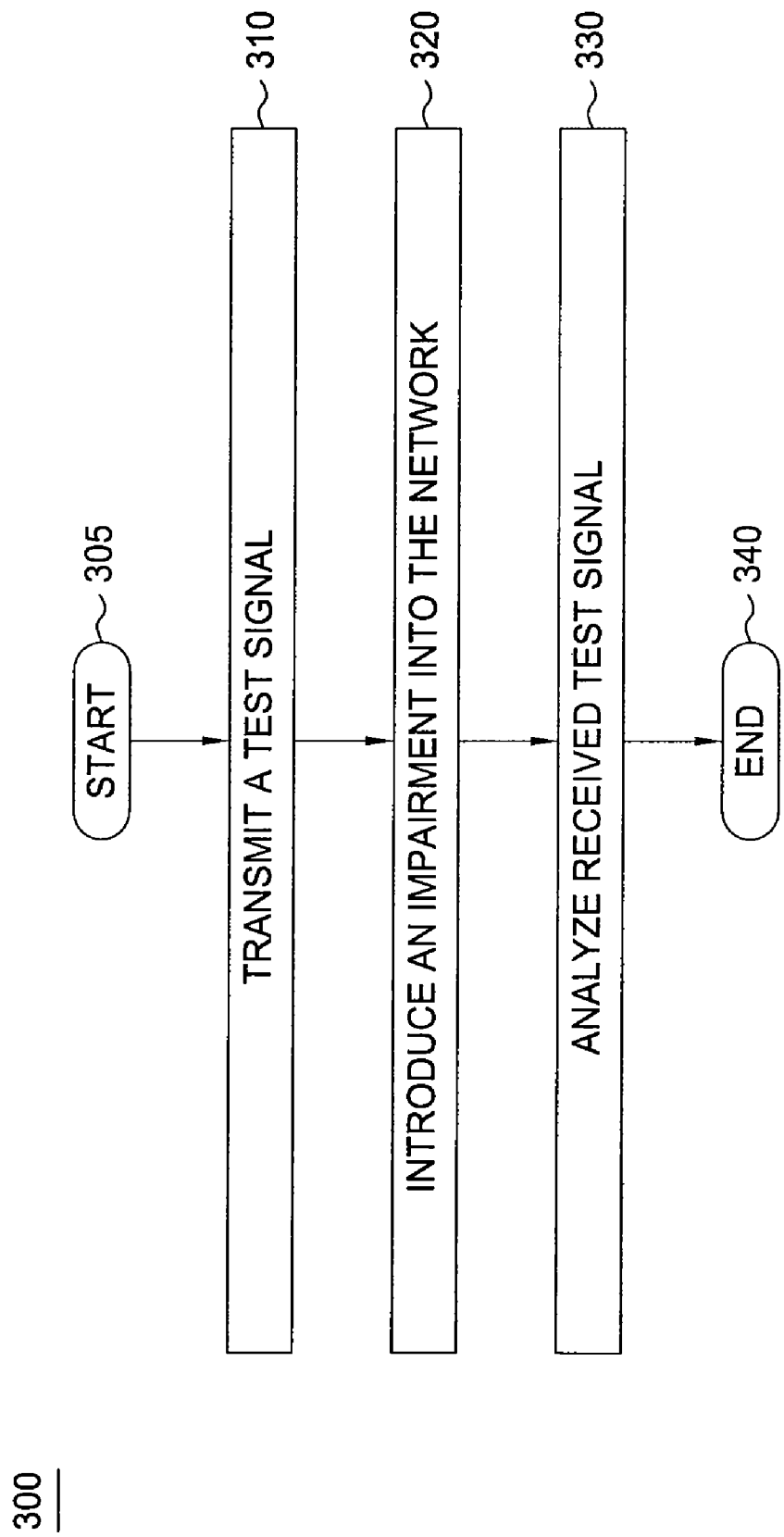
FIG. 3 illustrates a flowchart of a method for evaluating adaptive jitter buffer performance in communication networks, e.g. packet networks such as Voice over Internet Protocol (VoIP) networks, of the present invention.

FIG. 3 illustrates a flowchart of a method 300 for evaluating adaptive jitter buffer performance in communication networks, e.g., packet networks such as Voice over Internet Protocol (VoIP) networks, of the present invention. Method 300 starts in step 305 and proceeds to step 310.

In step 310, the method generates (or retrieves from a storage device) the test signal and transmits the test signal across a packet network, e.g., a VoIP network. For example, the test signal is generated by a test signal generator.

In step 320, the method injects delay impairments to introduce jitters along the transport path of the test signal in the VoIP network preceding the VoIP device with the jitter buffer to be tested. Delay impairments injected may include injecting a fixed delay and then removing it or injecting variable delays along the transport path. For example, delay impairments are injected by an impairment simulator.

In step 330, the method analyzes the received test signal after it passes through the VoIP device with the jitter buffer to be evaluated. For example, the received test signal is analyzed by a test signal analyzer. It should be noted that the VoIP device may perform any number of different forms of signal processing on the test signal. However, the processing that is the focus of the present invention is the buffering or queuing of the test signal that will be evaluated by the present invention.

In one embodiment, in the case of added fixed delay impairments, VoIP devices with an adaptive jitter buffer can increase the buffer size to avoid losing packets because they arrive too late. When an adaptive jitter buffer increases its size by an amount, it creates a gap in the transmitted signal equal to that amount. By analyzing the received test signal, that gap can be identified as either:
- a silent gap added within an index pattern or the base pattern in the received test signal;
- a period where the VoIP device uses a packet loss concealment algorithm to mask the missing signal by repeating one or more previous frequencies from an index pattern or the base pattern in the test signal; or
- an increase in length in one of the 1 second silent periods within the received test signal.

In one embodiment, in the case of removed fixed delay impairments, VoIP devices with an adaptive jitter buffer can decrease the buffer size to reduce delay in transmission. The decrease in jitter buffer size can be identified by two changes:
- One or more frequencies in the received test signal are missing and are not replaced by any other signal; or
- A silent period is less than 1 second in length.

In the case of variable delay impairments, VoIP devices with an adaptive jitter buffer can increase and decrease the buffer size to compensate for the variable delay injected. The aforementioned behaviors of the received test signal can be analyzed to identify when and how much the jitter buffer grows and shrinks, and it can determine how severely the adaptive jitter buffer will impact performance.

The method ends in step 340.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
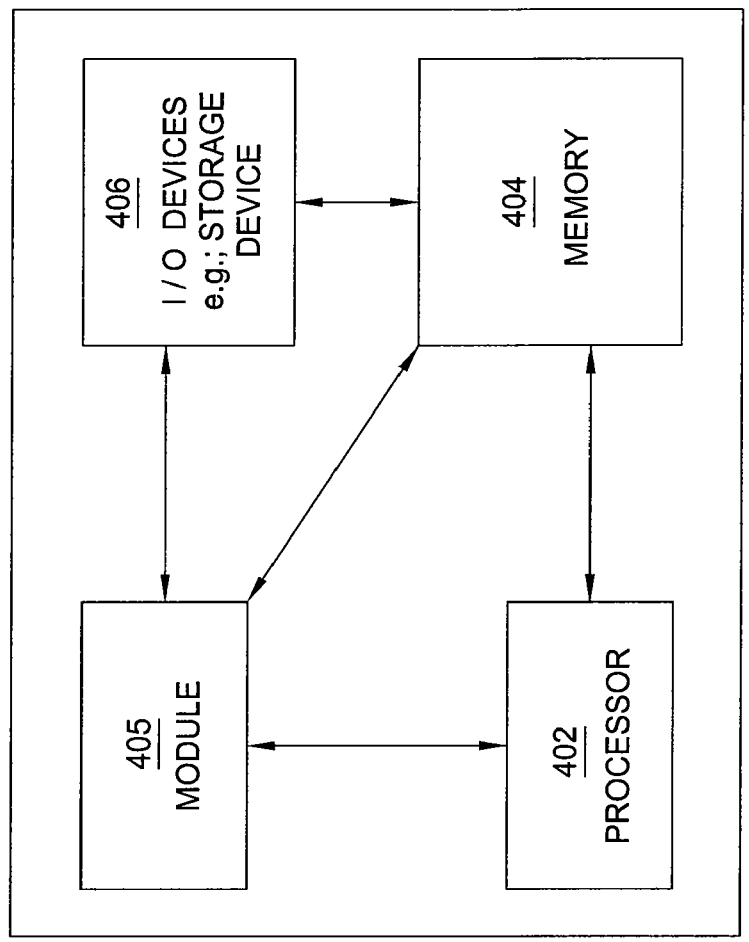
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for evaluating adaptive jitter buffer performance, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for evaluating adaptive jitter buffer performance can be loaded into memory 404 and executed by processor 402 to implement the functions as discussed above. As such, the present process 405 for evaluating adaptive jitter buffer performance (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for evaluating an adaptive jitter buffer in a communication network, comprising:
   transmitting a test signal into the communication network, wherein the test signal comprises a leading silence period followed by a plurality of repeating test signal components, wherein each of the plurality of repeating test signal components comprises a plurality of subcomponents, wherein each of the plurality of subcomponents comprises a trailing silence period preceded by a set of different index patterns followed by a set of identical base patterns;
   applying a jitter impairment along a path traversed by the test signal in the communication network preceding a device supporting a voice over internet protocol service, wherein the device includes the adaptive jitter buffer; and
   analyzing the test signal that is received from the device to determine a performance of the adaptive jitter buffer.

2. The method of claim 1, wherein the communication network is a voice over internet protocol network.

3. The method of claim 1, wherein the plurality of subcomponents comprises three subcomponents, and the set of different index patterns comprises 27 different index patterns.

4. The method of claim 1, wherein the plurality of repeating test signal components comprises five repeating test signal components.

5. The method of claim 1, wherein the jitter impairment comprises a fixed delay.

6. The method of claim 1, wherein the analyzing comprises:

detecting a jitter buffer size increase by observing a silent gap added within an index pattern in the test signal.

7. The method of claim 1, wherein the analyzing comprises:
    detecting a jitter buffer size increase by observing a silent gap added within a base pattern in the test signal.

8. The method of claim 1, wherein the analyzing comprises:
    detecting an increase in a length in a silence period within the test signal.

9. The method of claim 3, wherein each index pattern in the set of different index patterns is constructed using a set of 12 distinct frequencies in a voiceband, between 300 Hz and 3400 Hz, divided into 4 groups of 3 distinct frequencies to produce a total of 81 different index patterns, wherein each index pattern in the set of different index patterns comprises 4 distinct frequencies and the total of 81 different index patterns is used in the three subcomponents, wherein each of the subcomponents comprises a different set of 27 different index patterns out of the total of 81 different index patterns and the base pattern comprises a sequence of 10 distinct frequencies in the voiceband, between 300 Hz and 3400 Hz.

10. The method of claim 6, wherein the analyzing further comprises:
    detecting a jitter buffer size decrease by observing a frequency in the test signal that is missing and is not replaced by another signal.

11. The method of claim 9, wherein the 12 distinct frequencies are at least 250 Hz apart from each other.

12. The method of claim 6, wherein the analyzing further comprises:
    detecting a jitter buffer size decrease by observing a silence period that is less than a length of a silence period in the test signal.

13. A non-transitory computer-readable medium having stored thereon a plurality of instructions, the plurality of instructions including instructions which, when executed by a processor, cause the processor to perform a method for evaluating an adaptive jitter buffer in a communication network, comprising:
    transmitting a test signal into the communication network, wherein the test signal comprises a leading silence period followed by a plurality of repeating test signal components, wherein each of the plurality of repeating test signal components comprises a plurality of subcomponents, wherein each of the plurality of subcomponents comprises a trailing silence period preceded by a set of different index patterns followed by a set of identical base patterns;
    applying a jitter impairment along a path traversed by the test signal in the communication network preceding a device supporting a voice over internet protocol service, wherein the device includes the adaptive jitter buffer; and
    analyzing the test signal that is received from the device to determine a performance of the adaptive jitter buffer.

14. The non-transitory computer-readable medium of claim 13, wherein the communication network is a voice over internet protocol network.

15. The non-transitory computer-readable medium of claim 13, wherein the plurality of subcomponents comprises three subcomponents, and the set of different index patterns comprises 27 different index patterns.

16. The non-transitory computer-readable medium of claim 13, wherein the plurality of repeating test signal components comprises five repeating test signal components.

17. The non-transitory computer-readable medium of claim 13, wherein the analyzing comprises:
    detecting a jitter buffer size increase by observing a period where the device uses a packet loss concealment algorithm to mask a missing signal by repeating a previous frequency from an index pattern in the test signal.

18. The non-transitory computer-readable medium of claim 15, wherein each index pattern in the set of different index patterns is constructed using a set of 12 distinct frequencies in a voiceband, between 300 Hz and 3400 Hz, divided into 4 groups of 3 distinct frequencies to produce a total of 81 different index patterns, wherein each index pattern in the set of different index patterns comprises 4 distinct frequencies and the total of 81 different index patterns is used in the three subcomponents, wherein each of the subcomponents comprises a different set of 27 different index patterns out of the total of 81 different index patterns and the base pattern comprises a sequence of 10 distinct frequencies in the voiceband, between 300 Hz and 3400 Hz.

19. The non-transitory computer-readable medium of claim 17, wherein the analyzing further comprises:
    detecting a jitter buffer size decrease by observing a silence period that is less than a length of a silence period in the test signal.

20. A system for evaluating an adaptive jitter buffer in a communication network, comprising:
    a test signal generator for transmitting a test signal into the communication network, wherein the test signal comprises a leading silence period followed by a plurality of repeating test signal components, wherein each of the plurality of repeating test signal components comprises a plurality of subcomponents, wherein each of the plurality of subcomponents comprises a trailing silence period preceded by a set of different index patterns followed by a set of identical base patterns;
    an impairment simulator for applying a jitter impairment along a path traversed by the test signal in the communication network preceding a device supporting a voice over internet protocol service, wherein the device includes the adaptive jitter buffer; and
    a test signal analyzer for analyzing the test signal that is received from the device to determine a performance of the adaptive jitter buffer.

* * * * *